United States Patent [19]

Long

[11] 4,013,810
[45] Mar. 22, 1977

[54] SANDWICH PANEL CONSTRUCTION

[75] Inventor: William Gordon Long, Lynchburg, Va.

[73] Assignee: The Babcock & Wilcox Company, New York, N.Y.

[22] Filed: Aug. 22, 1975

[21] Appl. No.: 606,912

[52] U.S. Cl. .............................. 428/308; 156/242; 156/306; 156/309; 264/DIG. 6; 264/119; 264/321; 428/306; 428/310; 428/315; 428/317; 428/322; 428/323; 428/325; 428/411; 428/902

[51] Int. Cl.$^2$ ..................... B32B 5/18; B32B 5/16; B32B 5/22

[58] Field of Search .......... 428/419, 325, 323, 308, 428/411, 317, 322, 306, 315, 310, 902, 367; 264/DIG. 6, 119, 321; 156/242, 306, 309

[56] References Cited

UNITED STATES PATENTS

| | | | |
|---|---|---|---|
| 3,316,139 | 4/1967 | Alford | 428/902 |
| 3,515,625 | 6/1970 | Sedlak | 428/325 |
| 3,524,794 | 8/1970 | Jonnes | 428/325 |
| 3,551,197 | 12/1970 | Lindquist | 428/325 |
| 3,649,435 | 3/1972 | Varlus | 428/902 |
| 3,707,434 | 12/1972 | Stayner | 428/325 |
| 3,769,126 | 10/1973 | Kolek | 428/392 |
| 3,769,150 | 10/1973 | King | 428/411 |
| 3,778,334 | 12/1973 | Sturgeon | 428/392 |
| 3,788,937 | 1/1974 | Lee | 428/317 |

Primary Examiner—Ellis P. Robinson
Attorney, Agent, or Firm—J. M. Maguire; J. P. Sinnott

[57] ABSTRACT

A typical embodiment of the resinous foam sandwich construction that characterizes the invention has face sheets of fiber reinforced thermoplastic resin laminates. The foam core is a mixture of hollow glass spheres and resin, in which the resin in the core is the same as the resin used to form the face sheets.

5 Claims, 1 Drawing Figure

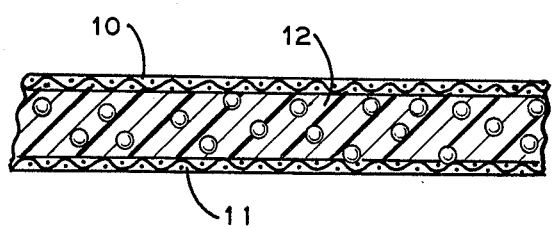

SANDWICH PANEL CONSTRUCTION

BACKGROUND OF THE INVENTION

1. Field of the Invention

This invention relates to sandwich construction and, more particularly, to resinous foam sandwich construction in which the same resin is used to form the face sheets and the foam core, and the like.

2. Description of the Prior Art

"Sandwich construction", or panels formed from pairs of thin, parallel face sheets of relatively stiff material that are bonded to a common core have been used for a number of years. Aircraft flooring is a typical example of one of these many uses. There also is a need for a strong, low density material, for a combination of sandwich panel materials that will provide a wide range of controlled core densities, as well as for a material that will permit greater flexibility in choosing core and face sheet thicknesses.

Typically, the face sheets for these sandwich panels have been made of fiber reinforced material that is glued, or otherwise bonded, to a balsa wood or aluminum "honeycomb" core. Although these sandwich structures provide high strength-to-weight and stiffness-to-weight ratios, they are nevertheless subject to a number of disadvantages.

For example, one or more special steps must be taken during the manufacturing process to apply an adhesive to the core and face sheets and to press these treated materials together to establish an acceptable bond. There are, moreover, definite limitations with respect to the degree to which these sandwich panels can be re-shaped or formed after manufacture. In this connection, the possibility of re-shaping the blade of a sandwich construction hockey stick after manufacture to match individual needs is a clearly desirable feature. Prior art sandwich panels, however, do not have this post-forming capability. There also is a further limitation on the complexity of the sandwich panel shapes that can be manufactured because of the structural characteristics of the balsa and honeycomb core materials.

Thus, there is a need for sandwich panels that not only are more readily manufactured, resistant to laser beam penetration, and provide high strength-to-weight and stiffness-to-weight ratios, but which also can be produced in complicated shapes and provide some capability for post-forming.

SUMMARY OF THE INVENTION

These foregoing problems can be overcome, and these needs can be satisfied both to a large extent, through the practice of the invention. In this respect, a novel core of resin mixed with glass spheres is sandwiched between two face sheets of fiber reinforced laminates which use the same resin as that of the core. In this way, there is no need to apply a special adhesive to the core and to the face sheets because the resin in the face sheets will bond directly to the same resin in the core without any appreciable difficulty. This feature of the invention also eliminates the need to choose only those adhesives that are compatible with the core and the face sheets.

If, moreover, a heat-softening, or thermoplastic resin, defined in the McGraw-Hill Dictionary of Scientific and Technical Terms, copyrighted 1974, as a material with a linear macromolecular structure that will repeatedly soften when heated and harden when cooled, is selected for use in the face sheets and in the core, there now is a potential for post forming a manufactured structure through the application of heat. Inasmuch as the core is formed from a mixture of resin and glass spheres that can be molded into almost any desired configuration, the further possibility of manufacturing more complex shapes now is present because the structural limitations imposed by balsa or aluminum honeycomb are not present, the core material now being moldable into almost any desired shape.

The relative weight percentages of resin and hollow glass spheres that can be chosen for a core mixture also present a further degree of flexibility in selecting the sandwich panel density to satisfy particular structural requirements. This flexibility heretofore has not been available because of the inherent density limitations imposed by balsa wood and aluminum honeycomb core materials. Naturally, sandwich panels produced in accordance with the present invention also can be used for aircraft flooring as well as in other applications, of which engine nacelles and sporting goods are typical.

The various features of novelty which characterize the invention are pointed out with particularity in the claims annexed to and forming a part of this specification. For a better understanding of the invention, its operation, advantages and specific objects attained by its use, reference should be had to the accompanying drawing and descriptive matter in which there is illustrated and described a preferred embodiment of the invention.

BRIEF DESCRIPTION OF THE DRAWING

The sole FIGURE of the drawing shows a side elevation in full section of a sandwich panel that embodies principles of the invention.

DETAILED DESCRIPTION OF THE PREFERRED EMBODIMENTS

For a more complete appreciation of the invention, attention is invited to the drawing. As shown, a pair of parallel, spaced face sheets 10, 11 of fiber reinforced thermoplastic resin laminates are compression molded at a temperature and pressure that is sufficient to produce a void-free product. Typically, a polysulfone resin and Kevlar or graphite fibers provide acceptable face sheets for this purpose.

Core 12 is a mixture of thermoplastic resin and hollow glass spheres. Preferably, and in accordance with a principle of the invention, the resin in the core should be the same as the resin in the face sheets 10, 11. Thus, polysulfone resin is mixed with glass spheres in which the spheres have a bulk density that ranges from 4 to 9 pounds per cubic foot and a particle size of 10 to 140 microns. The spheres, moreover, in this illustrative example comprise 16% by weight of the core mixture and the resin amounts to the remaining 84% by weight of the core material.

The core thickness as well as the overall sandwich panel thickness is selected to satisfy specific requirements, of which noise suppression, strength or resistance to laser penetration are typical.

Specific examples of sandwich panels constructed in accordance with the principles of the invention are as follows:

| Panel Characteristics | Example 1 | Example 2 |
|---|---|---|
| Resin type | Polysulfone | Polysulfone |
| Fiber type | Kevlar | Graphite |
| Foam thickness | .200″ | .150″ |
| Panel thickness | .330″ | .255″ |
| Overall panel density | 66 lbs/ft$^3$ | 68 lbs/ft$^3$ |
| Crushing strength | ~1000 lbs/in$^2$ | ~1000 lbs/in$^2$ |
| Flexural strength | 21,000 lbs/in$^2$ | 62,000 lbs/in$^2$ |
| Flexural modulus | 2.6 × 10$^6$lbs/in$^2$ | 10.7 × 10$^6$lbs/in$^2$ |

It should be noted in this respect that the weight percent of the sphere content in the core 12 can be varied up to a maximum of approximately 35%. Sphere concentrations in the core 12 that are over 35% by weight have been found to produce a foam material that has poor integrity. Although hollow glass spheres are shown and described in connection with the preferred embodiment of the invention, other shapes and materials can be employed, as appropriate, to produce the foam core 12 if the material from which these shapes are formed changes from the solid state to a liquid or plastic state at some temperature which is appreciably higher than the temperature at which the resin plasticizes.

Among the many thermoplastic resins that can be used in the face sheets 10, 11 and the core 12, in addition to the Polysulfone resin considered above, it further appears that naryl and phenoxy also are particularly suited to the purposes of this invention. In any event, specific resins should be chosen on the basis of one or more properties that are to be imparted to the sandwich panel and its constituents, such as stability at elevated temperatures, density, moisture resistance and ease of fabrication.

It should also be noted that the thickness of the foam core 12, as well as the thickness of the entire sandwich panel should be selected to satisfy particular application requirements. Core thicknesses have been found suitable in the range from approximately ⅛ inch to ⅜ inch and face sheet thicknesses have ranged from 0.040 inch to 0.120 inch.

In accordance with a further aspect of the invention, the sandwich panels are manufactured by dissolving solid polysulfone thermoplastic resin in trichlorethylene to produce a solution, and by blending in an appropriate amount of hollow glass spheres to form the mixture which is cast into a suitable form to produce the foam. The foam is then dried to remove the volatile solvent.

The face sheets 10, 11 are formed through compression molding a mixture of polysulfone and graphite fibers at 700° F and 200 lbs/in$^2$ to produce a void-free product. The face sheets 10, 11 are then placed over the cast foam core 12 and remolded under a pressure of about 11 lbs/in$^2$ at 600° F in order to cause the resin to flow and bond the core 12 to the face plates. If good adhesion between the core and the face sheets is required and it is important to avoid separation between the face sheets 10, 11 and the core 12, it is advisable to interpose a layer of the thermoplastic resin that is common to the core and to the face sheets at the interfaces between the core and the respective face sheets before the face sheets are remolded to match the contour of the core. This additional resin layer can be applied as a film or in solvent form.

Thus, there is provided in accordance with the principles of the invention a superior sandwich panel that is relatively easy to manufacture, can be molded into more complicated shapes than those which were heretofore obtainable and has the further qualities of selectable low densities, good strength characteristics and potentially may have a marked resistance to laser beam penetration.

The embodiments of the invention in which an exclusive property or privilege is claimed are defined as follows:

1. A sandwich panel consisting essentially of a foam core of thermoplastic resin, non-fibrous shapes mixed with said thermoplastic resin and formed from material remaining in the solid state at a higher temperature than the plasticizing temperature of said thermoplastic resin wherein said non-fibrous shapes are not more than 35% by weight of said foam core, and face sheets formed from thermoplastic resin reinforced with graphite fibers for, said face sheets being bonded to said foam core, said thermoplastic resin in said face sheets being the same type as said foam core resin.

2. A sandwich panel according to claim 1 wherein said shapes are hollow glass spheres.

3. A sandwich panel consisting essentially of a foam polysulfone core, hollow glass spheres ranging in size from 10 to 140 microns mixed with said polysulfone core resin in an amount of 35 percent by weight or less of said spheres to 65% by weight or more of said core resin, said core having a thickness from approximately ⅛ inch to ⅜ inch, and face sheets bonded to said core, said face sheets being formed from polysulfone thermoplastic resin and graphite fibers, said face sheet thickness ranging from 0.040 inch to 0.120 inch.

4. A method for manufacturing a sandwich panel consisting essentially of the steps of mixing a thermoplastic resin with a solvent to dissolve said thermoplastic resin, mixing hollow glass spheres with said dissolved thermoplastic resin, casting said mixture of glass spheres and dissolved thermoplastic resin into a desired shape, drying said cast mixture to drive off said solvent to form a foam core for the sandwich panel wherein said spheres are not more than 35% by weight of said foam core preparing a mixture of said thermoplastic resin with graphite fibers, compression molding said resin and fibers to produce a void-free face sheet, placing said face sheet on said foam core, and remolding under conditions of heat and pressure said face sheet to cause said thermoplastic resin to flow and to bond said face sheet to said foam core.

5. A method according to claim 4 further comprising the step of interposing an additional layer of said thermoplastic resin between said face sheet and said foam core.

* * * * *